United States Patent
Schwetz et al.

(10) Patent No.: US 6,960,058 B2
(45) Date of Patent: Nov. 1, 2005

(54) DEVICE FOR STACKING AND UNSTACKING

(75) Inventors: Anton Schwetz, Ebersdorf (AT); Thomas Rotbart, Birkfeld (AT); Johann Kurzweil, St. Peter am Ottersbach (AT); Helmut Gragenhofer, Pollau (AT)

(73) Assignee: BM-Battery Machines GmbH, Ebersdorf (AT)

( * ) Notice: Subject to any disclaimer, the term of this patent is extended or adjusted under 35 U.S.C. 154(b) by 0 days.

(21) Appl. No.: 10/472,149

(22) PCT Filed: Nov. 7, 2002

(86) PCT No.: PCT/AT02/00313
§ 371 (c)(1),
(2), (4) Date: Jul. 16, 2004

(87) PCT Pub. No.: WO2004/028932
PCT Pub. Date: Apr. 8, 2004

(65) Prior Publication Data
US 2004/0240982 A1 Dec. 2, 2004

(30) Foreign Application Priority Data
Sep. 26, 2002 (AT) .................................. A 1453/2002

(51) Int. Cl.[7] ............................................. B65G 57/14
(52) U.S. Cl. ............................... 414/793.9; 414/793.4; 414/793.7; 414/794.2
(58) Field of Search .......................... 414/793.4, 793.7, 414/793.9, 794.2

(56) References Cited

U.S. PATENT DOCUMENTS

| | | | | |
|---|---|---|---|---|
| 2,193,264 A | * | 3/1940 | Bashore | 414/793.7 |
| 2,266,170 A | * | 12/1941 | Currie | 414/793.7 |
| 2,919,821 A | * | 1/1960 | Young | 414/790 |
| 3,458,058 A | * | 7/1969 | Faerber | 414/790.3 |
| 4,343,583 A | | 8/1982 | Diver et al. | |
| 5,101,956 A | | 4/1992 | Gambetti | |
| 5,941,367 A | * | 8/1999 | Osti et al. | 198/475.1 |
| 6,158,570 A | | 12/2000 | Strasser et al. | 198/450 |

FOREIGN PATENT DOCUMENTS

| | | |
|---|---|---|
| DE | 2 421 630 | 11/1974 |
| DE | 44 14 001 | 10/1994 |
| EP | 0 009 476 B1 | 4/1982 |
| GB | 845211 | 8/1960 |
| GB | 2 034 271 A | 6/1980 |

* cited by examiner

Primary Examiner—Douglas Hess
(74) Attorney, Agent, or Firm—Young & Thompson

(57) ABSTRACT

A device for handling stacking or removing articles from a stack, has a stacking wheel located between the lifting elements for stacks and a conveyor. When the stacking wheel turns, depending on the direction of its rotation, an article is moved from the conveyor onto the stack in the lifting direction. The stacking wheel bears pairs of holding plates distributed around its periphery; on them swivelling fingers are supported. The swivelling fingers are pressed by springs into their action position in which they project over the facing surfaces of the holding plates and fit into receiving openings of the articles when articles are moved by the stacking wheel. Control plates are assigned to the stacking wheel and engage with their ramp edges the concave, downwardly pointing surface of the swivelling fingers to swivel them into their readiness position which does not project to the inside over the holding plates.

20 Claims, 9 Drawing Sheets

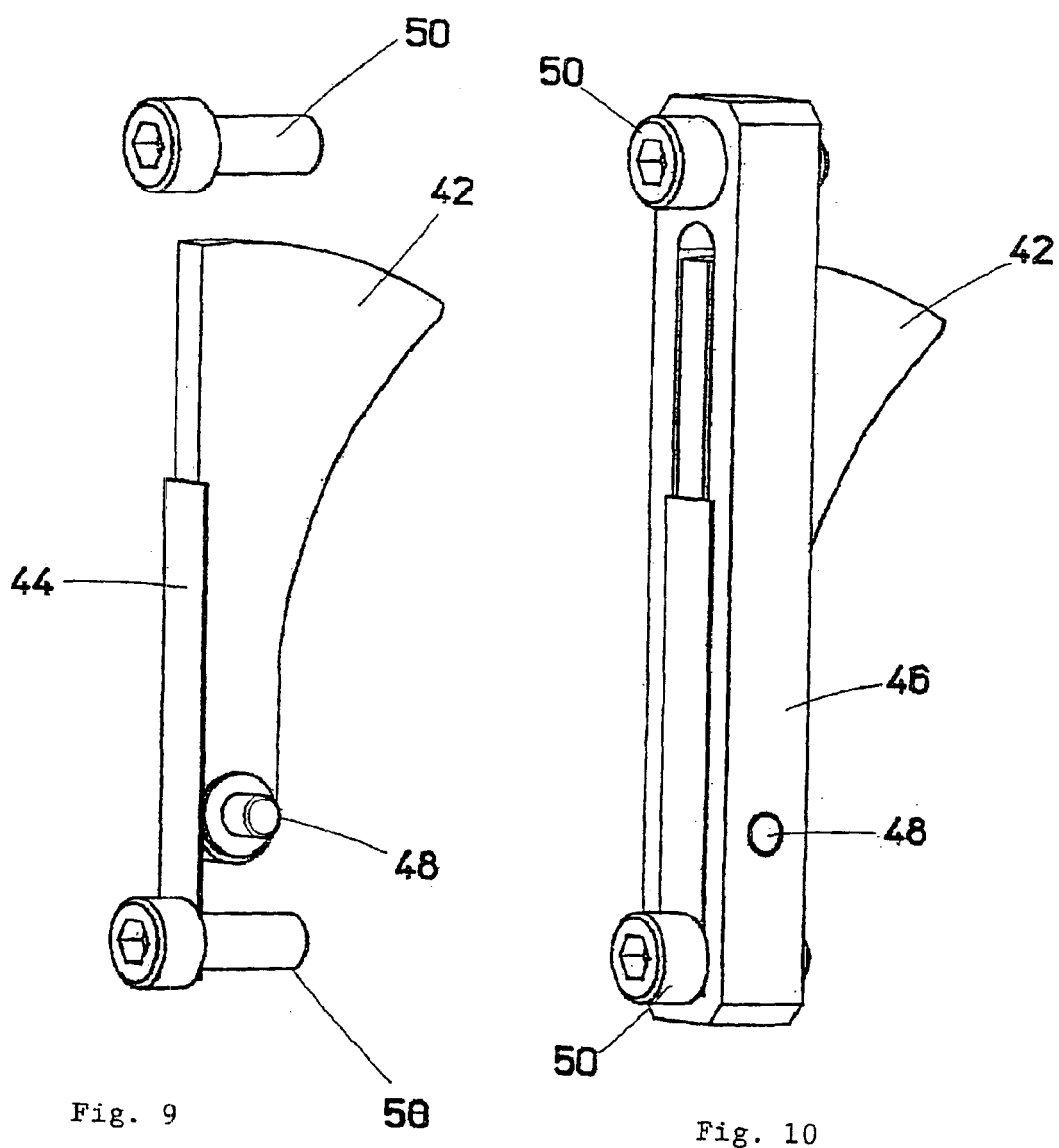

DEVICE FOR STACKING AND UNSTACKING

The invention relates to a device with the features of the introductory part of claim 1.

Plastic boxes are being increasingly used to transport goods, especially in the foodstuffs area, but also in the nonfoodstuffs domain. Dimensions of these boxes are for example 600×400×180 mm. Other box sizes are for example 400×300×180 mm.

There are cases, especially postal distribution centers and warehouses, where up to 100,000 of these boxes are shipped in and out daily. This is done generally during the night with considerable labor, personnel and time costs.

Usually box stacks with a height up to roughly 2 m are delivered and must be supplied to individual conveyor belts for loading. In commissioning of goods the boxes come individually from the warehouse and must be restacked as ordered into stacks up to 2 m high. The similar applies to postal distribution centers.

There are currently no systems with which stacking and unstacking of these boxes are possible and which enable a throughput for example of more than 1800 boxes per hour.

The known systems can either only stack or unstack. Devices which can both stack and also unstack are unknown.

One disadvantage of the known devices is also that the handling of the boxes is very jerky, therefore takes place with high acceleration peaks so that these devices cannot be used especially in the area of foodstuffs or in the transport of sensitive articles (Christmas tree ornaments). The disadvantage in the known devices is also that longer paths must be traversed.

In the known devices for stacking and in the known devices for unstacking there is however another problem. The removal of the unloaded boxes must proceed so quickly that at the desired throughputs in the past damage to goods could not always be precluded. Therefore the known devices are also designed for a throughput of a maximum 1800 boxes per hour.

GB 845211 A and EP 9476 B1 disclose devices for stacking plate-shaped articles on top of one another. With these known devices plate-shaped articles (battery plates) can be stacked on top of one another using a stacking wheel. The stacking wheel has two opposing carriers which turn synchronously around a common axis. On the carriers there are claws which project into the space between the carriers and which grip the plate-shaped articles which are to be stacked. In doing so the claws are pivotally supported on the carriers so that they can swivel into the position which projects into the space between the carriers in which they can grip the plates which are to be stacked. When the plates are deposited on an already formed stack of several plates or a carrier for such a stack the claws will run on and are swivelled out and deposit the plate on the stack.

The object of the invention is to develop a device of the initially mentioned type such that it can be used both for stacking and also for unstacking, especially of boxes of the aforementioned type.

This object is achieved with a device which has the features of claim 1.

Preferred and advantageous developments of the device as claimed in the invention are the subject matter of the dependent claims.

The invention is based on a development of the proven principle of stacking wheels which is known for example from the aforementioned EP 9476 B1. This principle offers the major advantage that short paths are possible for round motions so that the peripheral speed is minimized and the movements for the goods which are transported into the boxes can be carried out carefully.

The device as claimed in the invention makes it possible to control the throughput in a wide range. Furthermore it is possible for all speed ranges which are required of conveyor engineering (delivery and removal of individual boxes and box stacks) can be accommodated. For example control in the range from 100 to 2800 boxes per hour is possible.

In one embodiment a further improvement of the careful transport of goods is achieved and damage to goods is precluded by the transfer of boxes during unstacking taking place in the area just after top dead center of the motion of a box on the stacking wheel. This has the advantage that the box is moving mostly horizontally at this instant and the vertical component of motion is only small. In this way only small horizontal acceleration forces by the removal belt are necessary to convey the box of the stacking wheel.

In one embodiment of the invention it is also advantageous if there are holding plates with several swivelling fingers located next to one another on the stacking wheel; this makes it possible for the boxes in which the receiving points are not identical to be stacked or unstacked. This yields the advantage that for boxes of different sizes continuous operation of the system is possible without resetting.

The control of the swivelling fingers which hold the boxes takes place using ramp sheets which ensure that the swivelling fingers are moved at the proper time into or out of their action position; this furthermore has the advantage that it is also ensured that the swivelling fingers do not hinder removal of boxes by the conveyor belt.

Damage to boxes is also precluded in this embodiment. The swivelling fingers are held back by the ramp or control sheets until the next box is in the receiving position.

Advantageously the device as claimed in the invention is combined with a stacking device with at least one lifting table. Thus it is ensured that the box of a stack which is uppermost at the time, that is, the stack from which boxes are to be unstacked, is located in the removal position.

Providing lifting tables also has the advantage that during unstacking, another stack can also be introduced into the device even when there are still boxes to be unstacked on the lifting table. As soon as the upper stack has been removed by unstacking the boxes, the already inserted stack is raised to such an extent that unstacking can be continued without interruption. An embodiment with two lifting tables is especially advantageous, After the start of unstacking of a lifted stack the lower lifting table is moved down and during the unstacking process of the boxes from the stack which is on the upper lifting table it accepts the lower stack of boxes. As soon as this stack of boxes has been transferred to the upper lifting table, the lower lifting table is moved back into the initial position and awaits delivery of the next stack. Therefore, in the device as claimed in the invention for feed of stacks there is advantageously a combination of two lifting devices, for example in the form of lifting tables, which combined with one another work such that the lower lifting device lifts a stack and transfers it to the upper lifting device as soon as no more boxes can be stacked in it.

It should be pointed out that even if the device has been or will be described initially and in the following embodiment explained using the example for stacking and unstacking of boxes, the device as claimed in the invention is fundamentally suitable for unstacking and stacking of any articles. Thus other components, such as for example housing parts, which are delivered stacked can be unstacked for further processing and handling. Similarly finished components can be stacked by the device as claimed in the invention.

The preferred application is however stacking and unstacking of boxes which are intended for transport of goods.

Other details, advantages and features of the invention derive from the following description of one example of a device as claimed in the invention which is designed in this example for the stacking and unstacking of boxes.

FIG. 9 shows details of the swivelling finger;

FIG. 10 shows a unit containing a swivelling finger and

Figure 1:
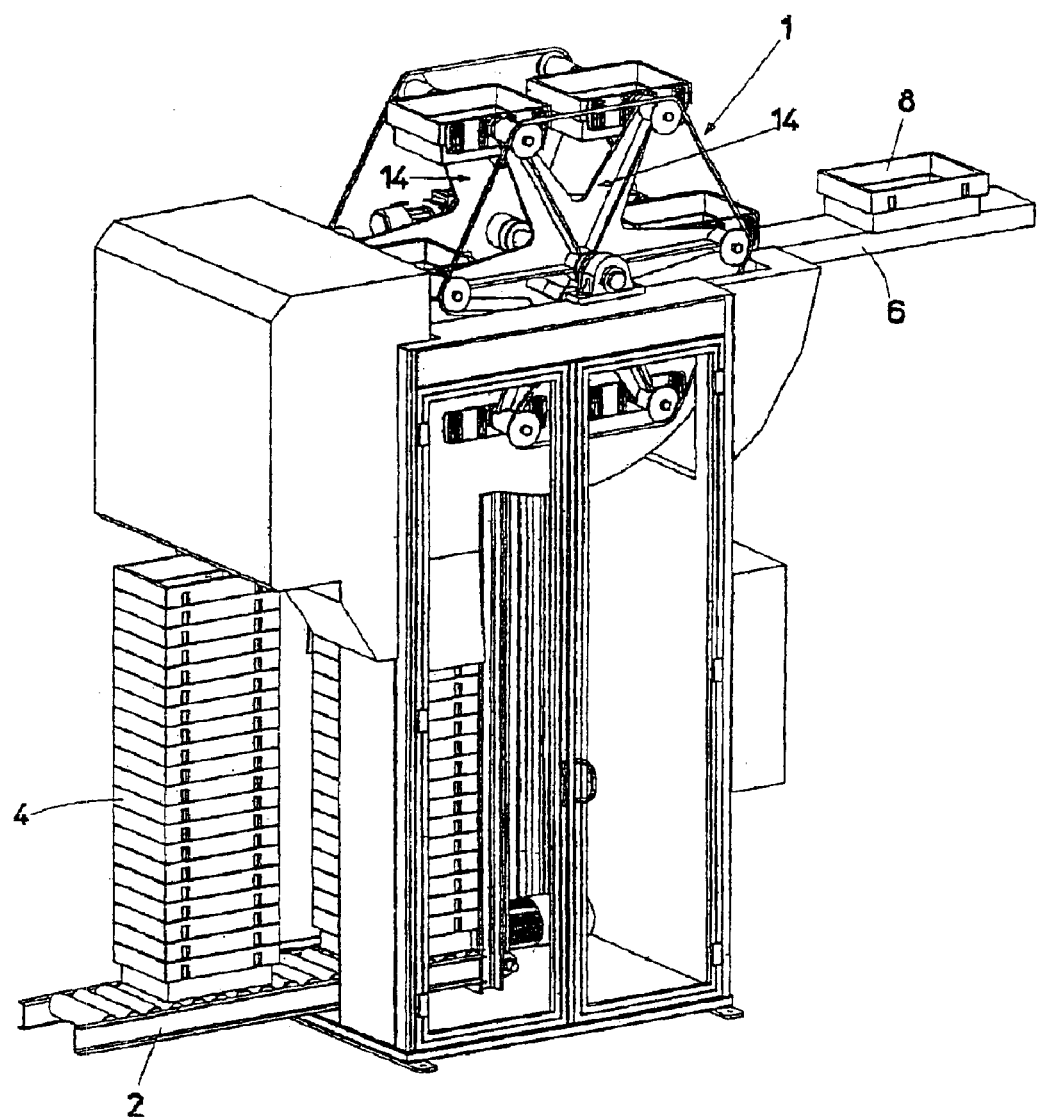
FIG. 1 shows in an oblique view a device as claimed in the invention for stacking and unstacking.
Figure 2:
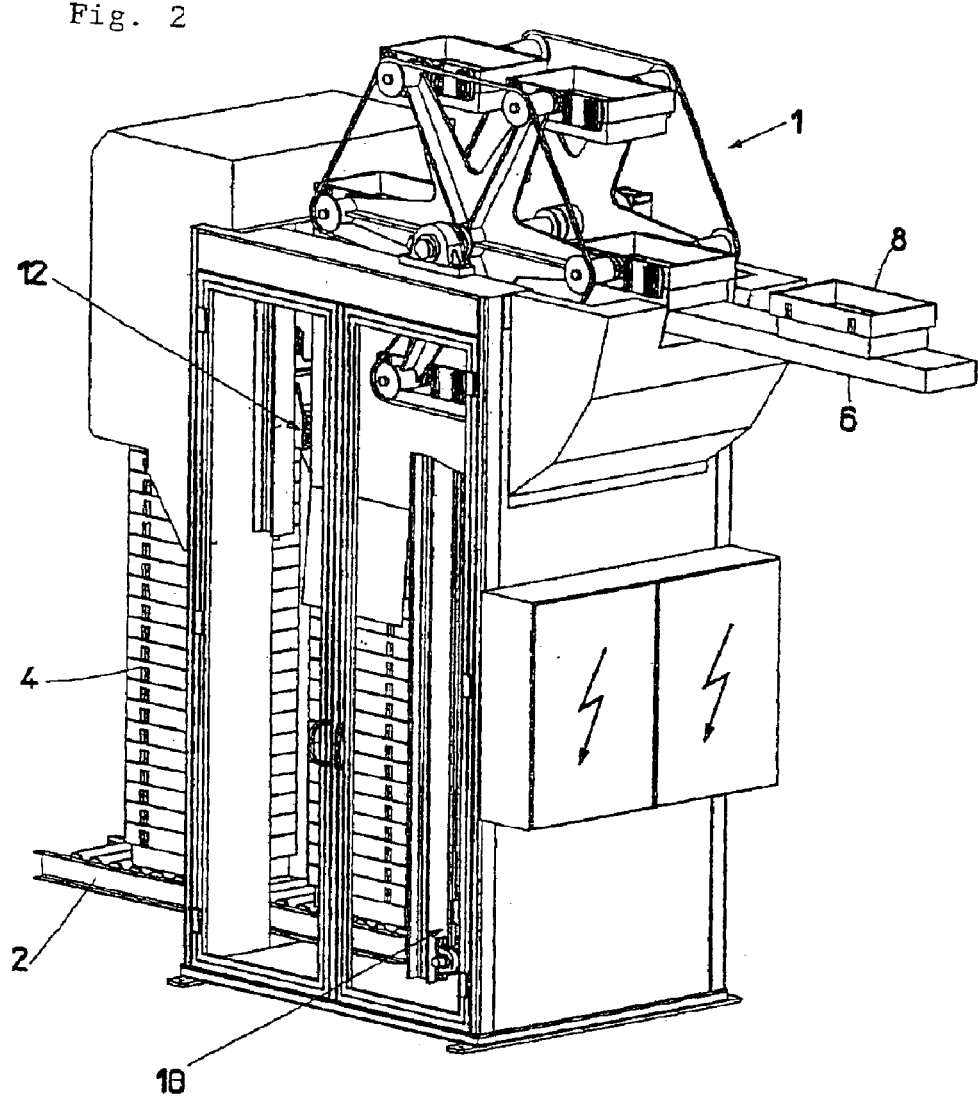
FIG. 2 shows the device from FIG. 1 in another view.

In the embodiment shown in FIGS. 1 and 2 the device as claimed in the invention with the stacking wheel 1 is located between a conveyor belt 2 for delivery and removal of stacks 4 of boxes on the one hand and a conveyor device 6 for the delivery and removal of individual boxes 8 on the other. In addition to the stacking wheel 1 which will be detailed later, the device has on the end of the conveyor 2 for supply and removal of the stacks 4 of boxes two lifting devices which work in alternation (FIGS. 2 and 4) for lifting the stacks 4 of boxes such that the uppermost box of the stack 4 of boxes is located in the removal position.

In this respect it should also be pointed out that the conveyor belt 6 for the separated boxes 8 in the embodiment is located at the height of the axis of the stacking wheel 1, but that it can also be higher in order to accept boxes 8 just after top dead center of the motion of the boxes 8.

Figure 3:
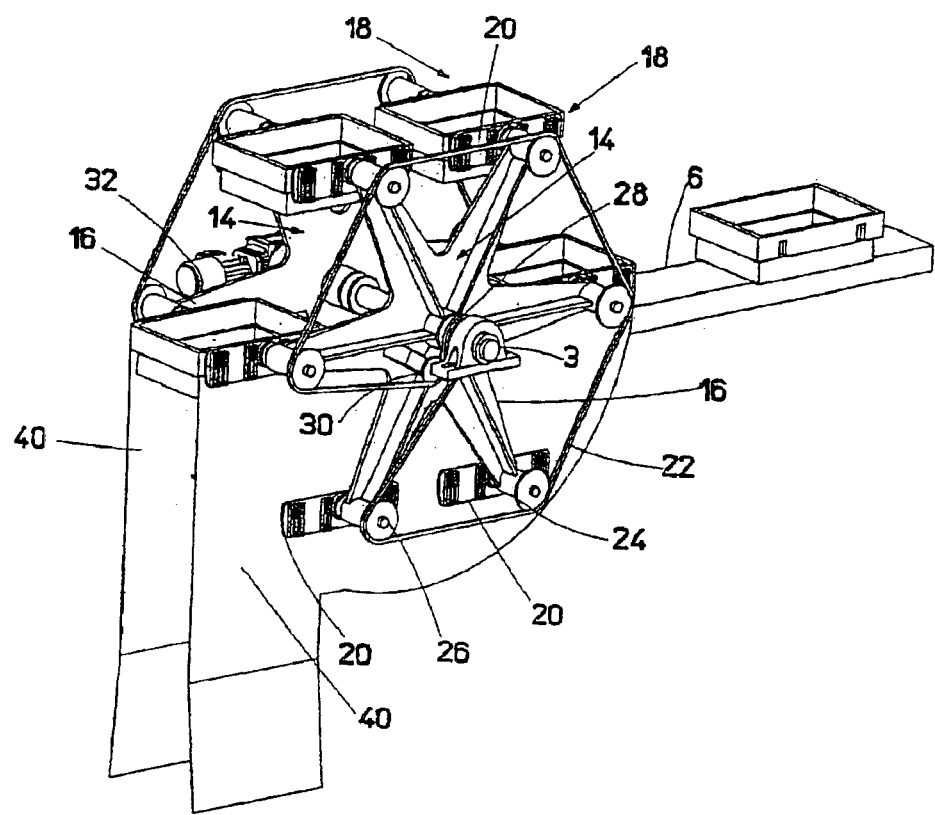
FIG. 3 shows a stacking wheel on an enlarged scale.

FIG. 3 shows that the stacking wheel 1 consists of two essentially star-shaped disks 14 which are arranged mirror-symmetrically, on each of the six arms 16 of each star 14 there being holding devices 18 for boxes 8. The holding devices 18 have holding plates 20 which are supported on the ends of the arms 16 of the stars 14. The holding plates 20 are connected to wheels 24 via axles 26. Per disk 14 the wheels 26 of each arm 16 are connected to one another by means of an endless element 22 and to a wheel 28 which is however mounted on the frame, which therefore does not turn with the stacking wheel 1, and which is located coaxially to the axis 3 of rotation of the stacking wheel 1. To tension the endless element 22, there is a tensioning roller 30 which is located on one arm of the star wheel.

In addition, there is a drive motor 32 to cause the stacking wheel 1 to rotate.

This construction ensures that the holding plates 20 which are provided on each arm 16 of the arm star 14 also always remain horizontally aligned when the stacking wheel 1 is set into rotation around its axis 3 by the drive motor 32.

On the side of the device on which the stacks 4 of boxes are supplied there are two lifting tables 10, 12. One lifting table 10 has its lower end position at the height of the end of the conveyor 2. The second lifting table 12 (FIG. 4) is designed to accept a stack 4 which has been raised by the first lifting table 10 and to move it into the position in which the box 8 which is uppermost at the time is removed. To do this there is at least one sensor which detects the uppermost box 8 and controls the movements of the second lifting table 12 such that the box 8 which is uppermost at the time assumes the position to the stacking wheel 1 which is correct for removing from or setting on the stack 4.

If the stack 4 of boxes which has been lifted by the second lifting table 12 (the upper lifting table) has been unstacked, therefore there are no longer any boxes on the second lifting table 12, the first (lower) lifting table 10 raises a stack 4 of boxes to such an extent that it can be accepted by the second lifting table 12 so that upon unstacking an essentially continuous mode of operation is possible.

In the stacking of boxes 8 which are supplied individually by the other conveyor 6, the lifting device with its two lifting tables 10, 12 works in reverse for stacks.

Figure 4:
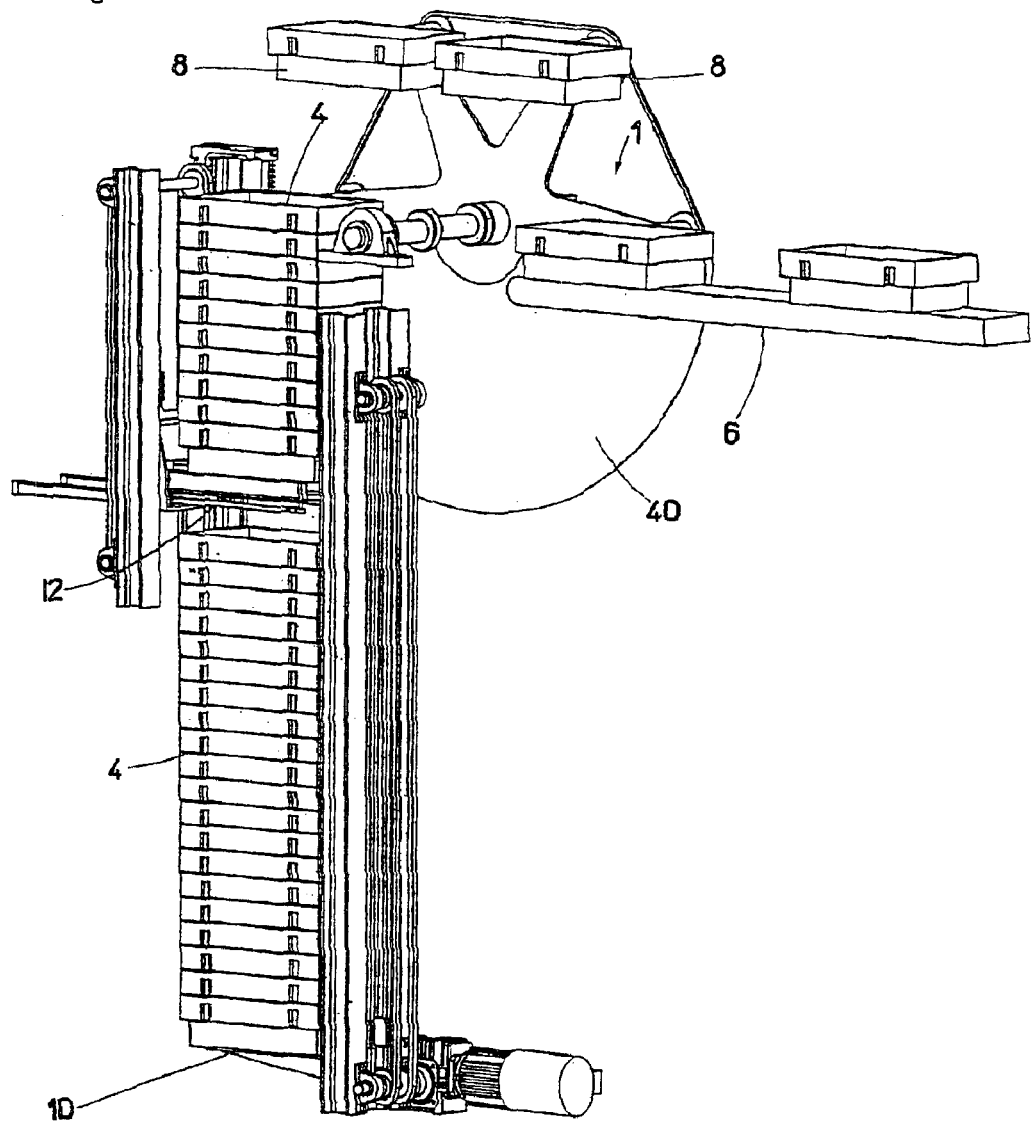
FIG. 4 shows the stacking wheel with the pertinent lifting device for unstacked boxes, omitting individual parts.
Figure 5:
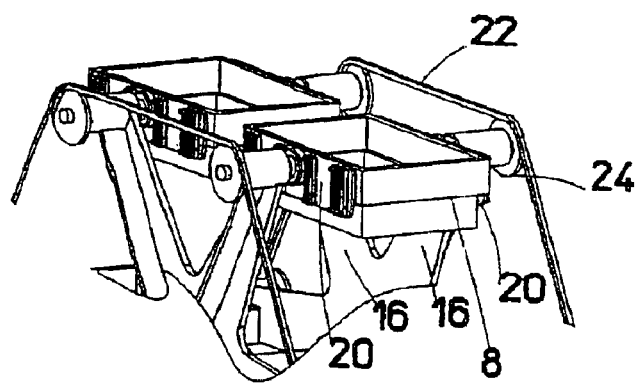
FIG. 5 shows a detail of the holding device for boxes on the stacking wheel.
Figure 6:
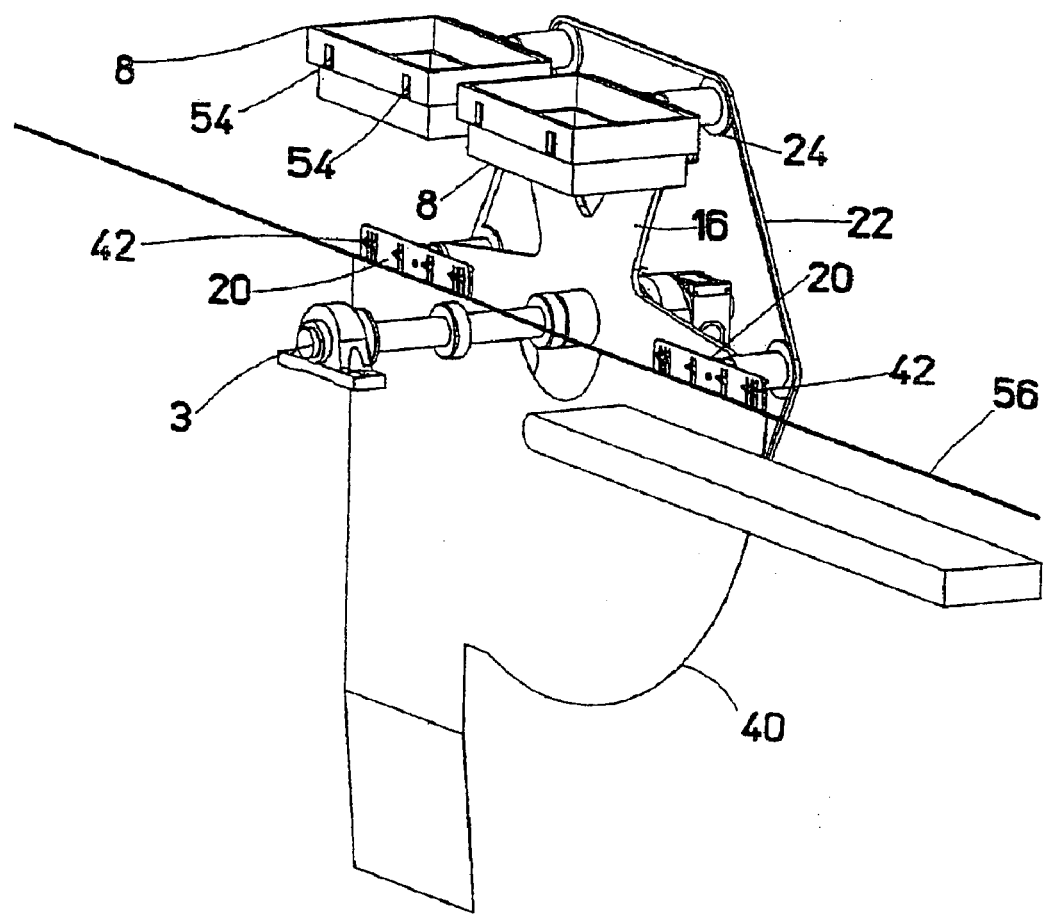
FIG. 6 shows the assignment of the control disk to the stacking wheel.

In particular FIGS. 4 and 6 show that just within each wheel star 14 of the stacking wheel 1 there is one control plate 40 each which are used as side guidance and as control for actuating the swivelling fingers 42 which are provided on the holding plates 20 (FIG. 6).

Figure 7:
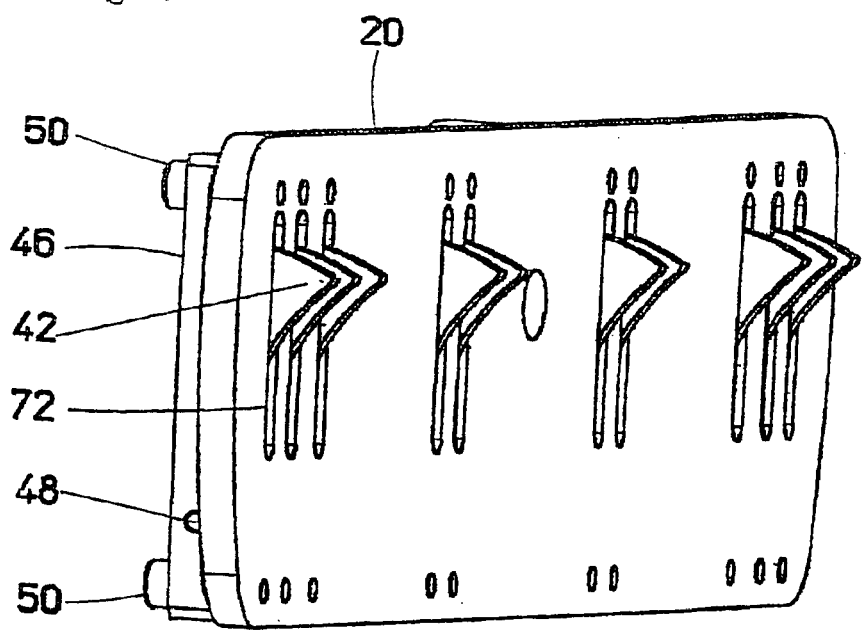
FIG. 7 shows on an enlarged scale a swivelling finger on the holding part of the stacking wheel in its action position.
Figure 8:
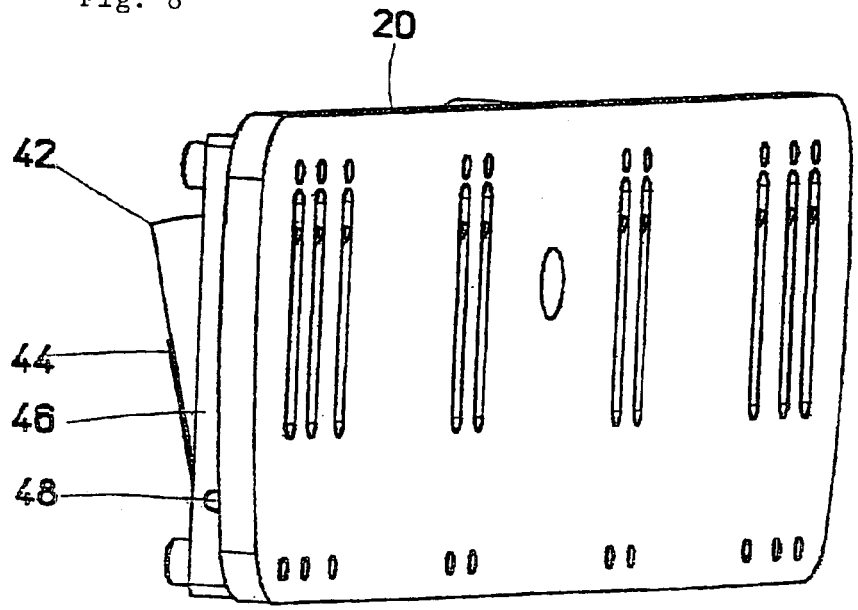
FIG. 8 shows the swivelling finger from FIG. 7 in its readiness position.

The swivelling fingers 42 on the holding plates 20 can be swivelled back out of the action position (FIG. 7) in which they project into the space between the two wheel stars 14 into an inactive position (FIG. 8). Here, as is shown in FIGS. 9 and 10, a leaf spring 44 is assigned to each swivelling finger 42 and loads the swivelling fingers 42 into their action position as shown in FIG. 7.

The swivelling fingers 42 are held in cassettes 46 and are supported in them to be able to swivel via cylinder pins 48. The cassettes 46 are mounted on the holding plates 20 of the stacking wheel 1 using two screws 50. One of the two screws 50 holds the leaf springs 44 in their position which is shown in FIGS. 9 and 10.

As shown for example by FIG. 6, on each holding plate 20 there are several swivelling fingers 42 so that each holding plate 20 is suitable for boxes 8 of different size or boxes 8 which are equipped with a different arrangement of the side receiving openings 54 for the swivelling fingers 42.

In this way it is ensured that the swivelling fingers 42 of the holding plates 20 which are located outside the side guide plates (control plates 40) are swivelled out into their action position as shown in FIG. 7, conversely the holding fingers 42 of all holding plates 20 which are located in the area of the side guide plates 40 are moved back into the position which is shown in FIG. 8.

Thus, by the choice and arrangement of the entry or exit edge 56 (upper edge of the control plates 40) the time and location can be determined at which the swivelling fingers 42 are folded in or and out.

The folded-out swivelling fingers 42 grip the boxes 8 individually and lift the boxes 8 from the end of the stack 4 which has been raised by the second lifting table 12, using the example of unstacking of boxes 8, and the boxes are moved by the stacking wheel 1 which turns clockwise in viewing FIG. 2 until they are deposited individually onto the exit conveyor belt 6. Here the arrangement of the entry and exit edge 56 of the side guide (control plate 40) is chosen such that the swivelling fingers 42 fold out into their action position as shown in FIG. 7 when the holding plate 20 on which they are provided is located in the area of a box 8 which is to be unstacked. This means that the swivelling fingers 42 which are used as holding fingers for boxes 8 do not touch the underlying boxes of the stack 4 since they are located between the side guide plates 40.

This arrangement of the entry and exit edge 56 on the side guides 40 also ensures that the swivelling fingers 42 are detached from the boxes 8 when they have been put down individually on the exit conveyor belt 6.

Logically the swivelling fingers 42 are moved into and out of their action position when the device as claimed in the invention for stacking of boxes 8 which have been delivered separately by the conveyor belt 6 is used. In this case the stacking wheel 1 (in FIGS. 1 and 2) turns counterclockwise.

Figure 11:
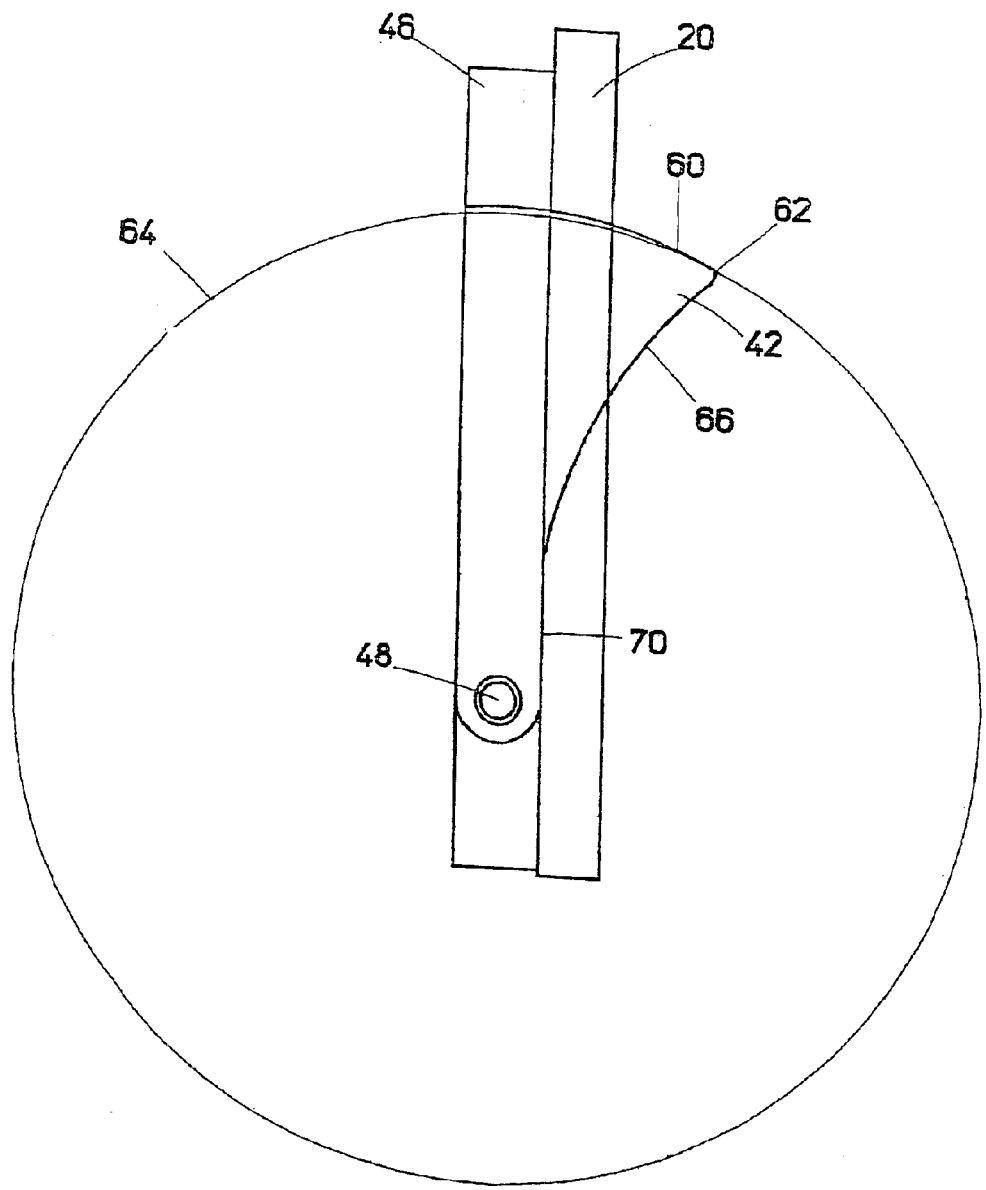
FIG. 11 shows the geometry of motion of the swivelling finger.

The geometry of the swivelling fingers is shown again in FIG. 11 which shows that the upper end surface 60 of the swivelling fingers 42 which comes into contact with the boxes 8 is a partial cylindrical surface 42 such that therefore the frontmost point 62 of each swivelling finger 42 is moved along a partial circular path 64 and thus an entry curve results which prevents a pinching effect when folding in. Also the downwardly pointing surfaces 66 of the swivelling fingers 42, therefore the surface which comes into contact with the entry and exit edge 56 of the side guides 40 in order to swivel the swivelling finger 42 out of the position which is shown in FIG. 11 and FIG. 7 back into the readiness position shown in FIG. 8 is made curved so that easy movement of this surface 66 which is used as a control edge relative to the entry and exit edge 56 results.

FIG. 11 shows that in the cassette 46 in which the swivelling fingers 42 are supported there is another plate 70 which prevents the swivelling fingers 42 from swivelling out farther than the position shown in FIGS. 11 and 7. Any other type of limitation of the swivelling capacity of the swivelling fingers 42, for example by the corresponding shaping of the slots 72 in the holding plates 20, is likewise conceivable.

In this way it is ensured that the swivelling fingers 42 which are used as removal fingers fit securely into the receiving openings 54 in the side surfaces of the boxes 8 which are to be stacked or unstacked if they are being removed from a stack 4 for separation, therefore unstacking, or conversely are being placed on top of one another into a stack 4.

It is apparent that with the device as claimed in the invention the re-usable boxes which are being used more and more often in modern logistics systems and in which goods are shipped, stored or commissioned, can be stacked and unstacked. With the device of the invention which is made as a modular box manipulator, stacking and unstacking can take place in systems for boxes with a size of 600×400 mm or 400×300 mm. Using the device as claimed in the invention, due to the stacking wheel a very high throughput at simultaneously low peripheral speed can be achieved. Short paths between the cycles are dictated by the stacking wheel. Thus boxes with dimensions of 600×400 mm for example in numbers up to 2500 per hour and smaller boxes (400×300 mm) with numbers up to 5000 per hour can be stacked and unstacked.

In summary one embodiment of the invention can be described as follows:

A device for handling of articles, especially boxes 8, for stacking articles or removing them from a stack 4, has a stacking wheel 1 which is located between the lifting means 10, 12 for stacks 4 of articles 8 and a conveyor means 6 for articles 8. When the stacking wheel 1 turns, depending on the direction of its rotation, an article 8 is moved from the conveyor means 6 onto the stack 4 in the lifting direction 10, 12. The stacking wheel 1 bears pairs of holding plates 20 distributed around its periphery; on them swivelling fingers 42 are supported. The swivelling fingers 42 are pressed by springs 44 into their action position in which they project over the facing surfaces of the holding plates 20 and fit into receiving openings 54 of the articles 8 when the articles 8 are moved by the stacking wheel 1. Control plates 40 are assigned to the stacking wheel 1 and engage with their exit edge 56 the concave, downwardly pointing surfaces 66 of the swivelling fingers 42 in order to swivel them into their readiness position which does not project to the inside over the holding plates 20. The upwardly pointing surfaces 60 of the swivelling fingers 42 on which the receiving openings 54 of the articles 8 sit are convexly curved partial cylindrical jacket surfaces. With this device, at high operating speeds careful handling of articles is possible; this is especially advantageous for boxes 8 filled with delicate goods.

What is claimed is:

1. Device for handling of articles (8) in order to separate the articles from a stack (4) or to combine the articles into a stack, comprising:
    a stacking wheel (1) located between an end of a stack (4) of articles (8) and a supply device (6) for supplying individual articles (8),
    a frame-mounted roller (28) located coaxial to an axis (3) of rotation of the stacking wheel (1),
    receivers (18) located on the stacking wheel (1), the receivers (18) for receiving the articles (8) which are to be stacked or unstacked, wherein,
    the receivers (18) are holding means to hold one article (8) at a time,
    the receivers (18) are provided with holding plates (20) for holding one article (8),
    the holding plates (20) are pivotally supported on the stacking wheel (1),
    the holding plates (20) comprise coupling devices (42) that fix on one article (8) at a time,
    rollers (24) are connected to the holding plates (20), and
    an endless element (22) is placed over all the rollers (24) and also over the frame-mounted roller (28).

2. Device as claimed in claim 1, wherein the coupling devices (42) comprise at least two swivelling fingers (42) supported on each holding plate (20) to be able to swivel.

3. Device as claimed in claim 1, wherein,
    the stacking wheel (1) further comprises two star-shaped plates (14) with star arms (16),
    the holding plates (20) are pivotally supported
    an outside periphery of the stacking wheel (1).

4. Device as claimed in claim 3, wherein one holding plate (20) at a time is pivotally supported on an end of each star arm (16) of the plates (14).

5. Device as claimed in claim 3, wherein the rollers (24) are located opposite the holding plates (20) with respect to the star arms (16).

6. Device as claimed in claim 5, wherein a tensioning roller (30) which turns with the stacking wheel (1) tensions the endless element (22).

7. Device as claimed in claim 5, wherein the rollers (24) are located opposite the holding plates (20) with respect to the star arms (16).

8. Device as claimed in claim 1, further comprising at least one lifting device (10, 12) to lift stacks (4) of articles (B) located adjacent to the stacking wheel (1).

9. Device as claimed in claim 8, wherein the lifting device comprises two lifting tables (10, 12).

10. Device as claimed in claim 1, further comprising a conveyor (6) for supply and removal of separated articles (8), an end of the conveyor located in a vicinity of a top dead center of the stacking wheel (1).

11. Device as claimed in claim 10, wherein there are control plates (40) for the actuation of the coupling devices (42).

12. Device as claimed in claim 11, wherein the coupling devices are swivelling fingers (42) which are supported on the holding plates (20).

13. Device as claimed in claim 12, wherein the control plates (40) are designed for controlling the swivelling fingers (42) and have ramp edges (56) located in the area of the end of the conveyor (6) and in the area of a top end of the stack (4) of articles (8).

14. Device as claimed in claim 12, wherein,
the swivelling fingers (42) fit, in an action position, into receiving openings (54) on side surfaces of the articles (8) which are to be handled, and
the swiveling fingers are loaded by springs (44).

15. Device as claimed in claim 14, wherein there are stops (70) which limit the swivelling of the swivelling fingers (42) in their action position.

16. Device as claimed in claim 12, wherein upwardly pointing end surfaces (60) of the swivelling fingers (42) are partial surfaces of cylinder jackets.

17. Device as claimed in claim 12, wherein downwardly pointing surfaces (66) of the swivelling fingers (42) are concavely curved.

18. Device as claimed in claim 12, wherein the swivelling fingers (42) are pivotally mounted in cassettes (46) which are attached to the outside of the holding plates (20).

19. Device for stacking and unstacking articles (8), comprising:
a frame;
a stacking wheel (1) supported on the frame;
a stack (4) of stacked articles (8) on a first side of the wheel;
a supply device (6) for supplying individual articles (8) on a second side of the wheel;
a frame-mounted roller (28) coaxial to an axis (3) of rotation of the stacking wheel (1);
receivers (18) mounted on the stacking wheel (1), the receivers (18) for receiving and holding the articles (8) one at a time;
holding plates (20) for holding one article (8) provided with each of the receivers, the holding plates (20) are pivotally supported on the stacking wheel (1), the holding plates (20) comprising coupling devices (42) that fix on one article (8) at a time;
rollers (24) connecting each of the holding plates (20) to an endless element (22), wherein,
the endless element is also connected to the frame-mounted roller (28).

20. Device for stacking and unstacking articles (8), comprising:
a stacking wheel (1);
a stacking area for a stack (4) of stacked articles (8) on a first side of the wheel;
a supply device (6) for supplying individual articles (8) on a second side of the wheel;
a roller (28) operatively positioned coaxial with an axis (3) of rotation of the stacking wheel (1);
receivers (18), mounted on the stacking wheel (1), for receiving and holding the articles (8) one at a time;
holding plates (20), for holding one article (8) each, provided with each of the receivers,
the holding plates (20) pivotally supported on the stacking wheel (1),
the holding plates (20) comprising coupling devices (42) that fix on one article (8) at a time;
rollers (24) connecting each of the holding plates (20) to an endless element (22), wherein,
the endless element is also connected to the frame-mounted roller (28) and operation of the endless element rotates the stacking wheel.

* * * * *